United States Patent [19]

Cox et al.

[11] Patent Number: 5,535,335

[45] Date of Patent: Jul. 9, 1996

[54] METHOD AND SYSTEM FOR REPORTING THE STATUS OF AN AGGREGATE RESOURCE RESIDING IN A NETWORK OF INTERCONNECTED REAL RESOURCES

[75] Inventors: David E. Cox, Raleigh; Karl D. Gottschalk, Durham; Craig M. Lawton; John F. Linton, both of Raleigh; John P. Whitfield, Apex, all of N.C.

[73] Assignee: International Business Machines Corporation, Armonk, N.Y.

[21] Appl. No.: 435,558

[22] Filed: May 5, 1995

Related U.S. Application Data

[63] Continuation of Ser. No. 995,602, Dec. 22, 1992, abandoned.

[51] Int. Cl.[6] .................................................. G06F 11/34
[52] U.S. Cl. .................. 395/200.11; 395/839; 395/838; 395/835; 395/837; 395/200.13; 395/600; 364/DIG. 1; 364/282.1; 364/284.4; 364/285.4
[58] Field of Search ........................ 395/839, 837, 395/835, 838, 200.13, 600; 364/DIG. 1

[56] References Cited

U.S. PATENT DOCUMENTS

| | | | |
|---|---|---|---|
| 4,769,761 | 9/1988 | Downes | 364/514 |
| 4,905,171 | 2/1990 | Kiel | 364/551.01 |
| 5,036,514 | 7/1991 | Downes et al. | 364/242.94 |
| 5,049,873 | 9/1991 | Robins et al | 379/14 |
| 5,090,014 | 2/1992 | Polich | 371/15.1 |
| 5,109,486 | 4/1992 | Seymour | 395/200 |
| 5,153,837 | 10/1992 | Schaffer | 364/464.04 |
| 5,181,204 | 1/1993 | Kasman | 395/183.21 |
| 5,226,120 | 7/1993 | Brown et al. | 395/200.11 |
| 5,243,543 | 9/1993 | Notess | 364/550 |
| 5,295,244 | 3/1994 | Dev et al. | 395/161 |
| 5,299,201 | 3/1994 | Carusone | 371/5.1 |
| 5,436,909 | 7/1995 | Dev et al. | 395/182.02 |
| 5,469,463 | 11/1995 | Polich et al. | 395/182.18 |
| 5,487,148 | 1/1996 | Komori et al. | 395/182.02 |
| 5,491,791 | 2/1996 | Glowny | 395/183.13 |

Primary Examiner—Thomas G. Black
Assistant Examiner—Jean R. Homere
Attorney, Agent, or Firm—John J. Timar; Edward H. Duffield

[57] ABSTRACT

In a network composed of communicating resources, the status of an aggregate resource may be determined by calculations based upon the status assumed by the real resources contained within the aggregate rather than being determined directly. The status of real resources may be propagated to still higher aggregate resources whose own status is based upon the status of the real resources contained within it. An aggregate resource may have multiple potential statuses and a decision as to which status to report for an aggregate resource at a given time is calculated based upon the status of the underlying real resources which it contains. Each real resource has associated with it another parameter which is its aggregation priority value indicating to what degree a change in its status will affect higher level nodes or aggregates in a network hierarchy. In assigning a new aggregate status to a given aggregate resource, the calculation for aggregate status determines the status of the real underlying resources that are descendents of the aggregate resource, retrieves the appropriate threshold levels for status change for the aggregate, and checks the aggregation priority of the real resources that are descendents of the aggregate and are currently in an unsatisfactory state and then assigns a new aggregate resource status.

8 Claims, 4 Drawing Sheets

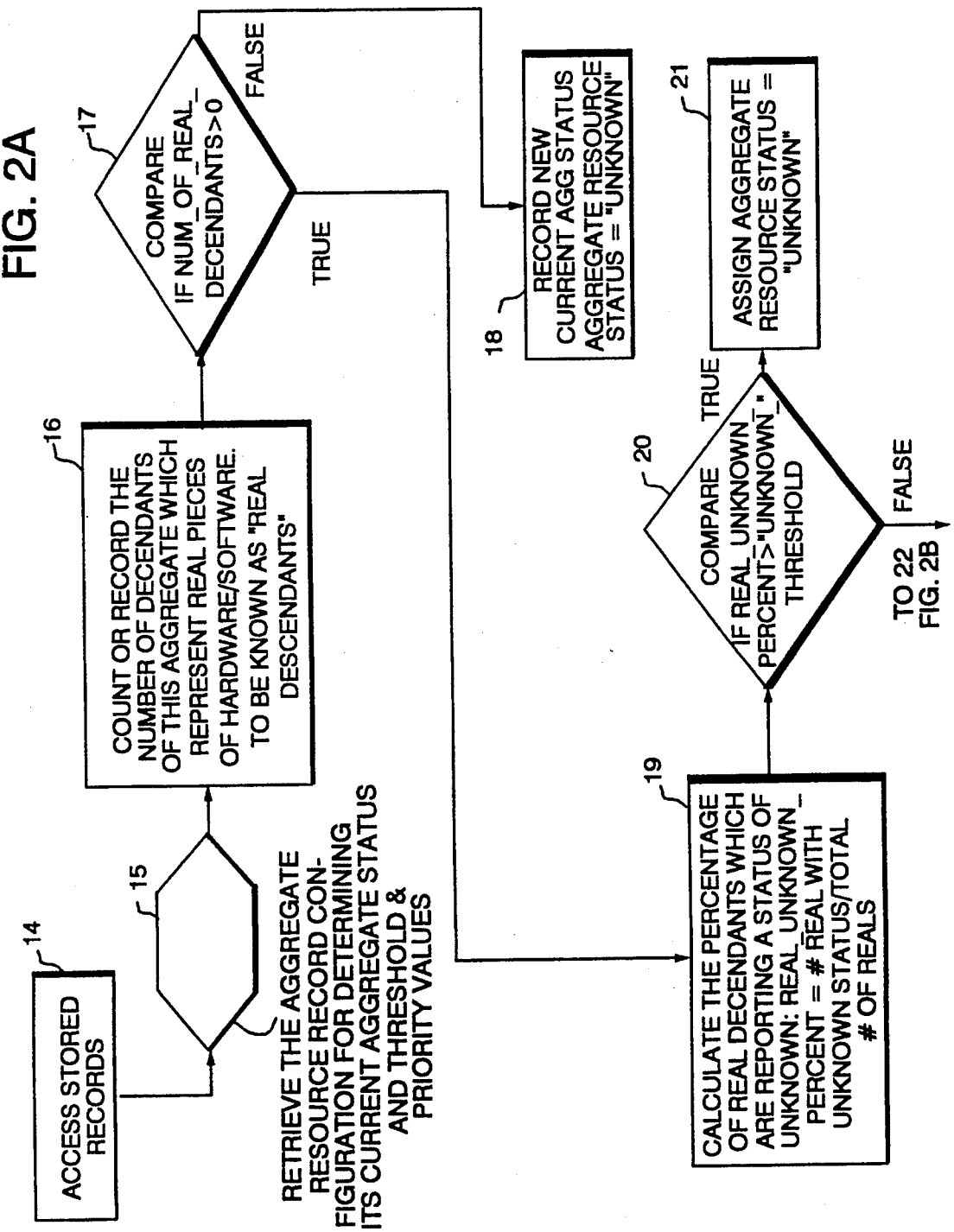

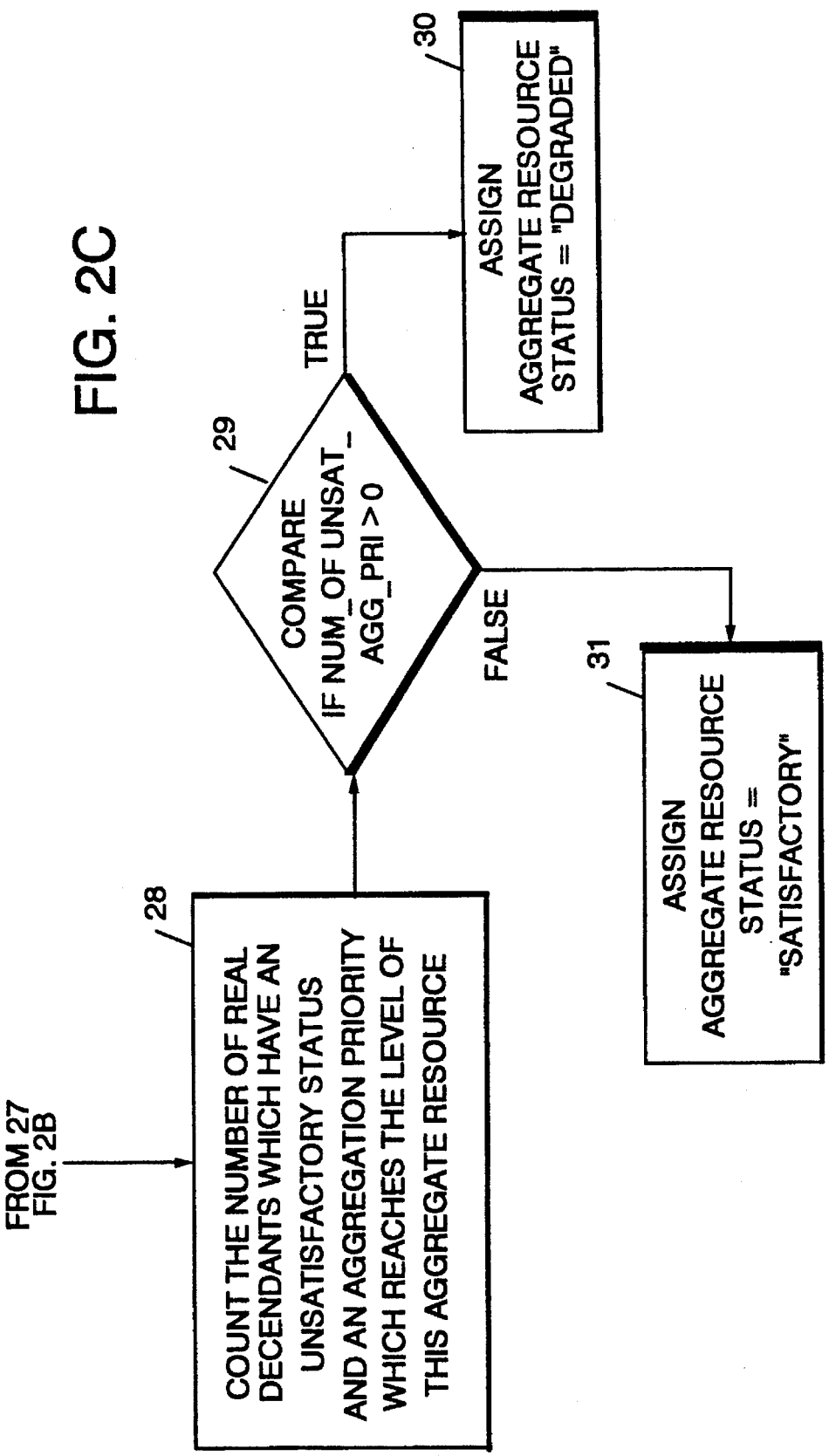

METHOD AND SYSTEM FOR REPORTING THE STATUS OF AN AGGREGATE RESOURCE RESIDING IN A NETWORK OF INTERCONNECTED REAL RESOURCES

This is a continuation of Ser. No. 07/995,602 filed on Dec. 22, 1992, now abandoned.

FIELD OF THE INVENTION

The invention relates generally to interconnected networks of communicating resources composed of either hardware, software or a mix of both typically present in communication network systems. More specifically, the invention deals with a system and method for determining the status of an aggregate resource that is a logical entity containing or composed of one or more real resources which are the hardware or software elements of the network.

PRIOR ART

The problem of maintaining an accurate awareness of the status of logical or aggregate resources in a communications network is an old one. An example of one approach to reporting the status or condition of an aggregate resource such as a LAN network is shown in U.S. Pat. No. 4,769,761 commonly assigned to the assignee of the present application. In this prior patent, stations of an aggregate communications network such as a logical ring or LAN each generate and transmit error reports containing error counts to a central ring error monitor at one of the stations. The error monitor analyzes the report and calculates and stores weighted error counts which are integrated over a selected time interval and compared with a threshold value found normal or acceptable for a communications network. Exceeding the threshold value sets an error flag to indicate possible station failures. This approach provides a rough estimation of the potential viability of the aggregate resource to continue operation but does not provide any means of calculating the actual status based upon the conditions of the underlying real elements contained within the logical aggregate and gives only a gross indication of the potential operative or inoperative status, not a real assessment of actual condition.

An assessment of the actual operative status of an aggregate resource at any given time must reflect both the nature of the aggregate resource and the degree of inoperability being experienced by one or more of the contained real resources which make up the aggregate.

OBJECTS OF THE INVENTION

In light of the foregoing known difficulties with the prior art, it is an object of this invention to provide an improved method and a system for determining the aggregate status based upon the actual status conditions of the contained underlying real resources in the network.

BRIEF SUMMARY

The foregoing and still other objects of the invention which are not specifically enumerated are met in a preferred embodiment described herein in which a calculation process and system are described for determining the aggregate resource status based on the status of the underlying real network resources. A real resource is defined as an actual operative piece of hardware or software residing within a network, for example a communications network arranged in some hierarchical or other interconnected topological arrangement whose interconnection scheme and last reported physical status are maintained in a network topological and status database by a network management system such as the IBM Corporation's NetView product. Such network management products are arranged to receive reports generated by network elements and management facilities whenever the state of a monitored resource changes. An aggregate resource is defined as a logical resource composed of or containing a number of real resources. Its status is calculated based upon the status of the real resources that it contains rather than being determined by its own characteristic since a determination based upon the real status of underlying elements will prove more reliable in estimating the ability of the aggregate resource to function. In the preferred embodiment, each aggregate resource has associated with it an aggregate status generated or determined based upon the status of the underlying real resources that it represents. If multiple levels of aggregate resource exist, each may in turn contain multiple real resources and the aggregate status of a high level aggregate resource is based upon the status of all real resources that it contains directly or indirectly by containing lower level aggregate resources which in turn may contain still further real resources.

In the preferred embodiment, the network resource topology and interconnection status database is queried to determine which real resources are contained within a given aggregate resource or hierarchy of aggregate resources, and what the status of each real resource is. Stored parameter values are used as threshold indicators for determining when the status of the aggregate resource should be modified. Each aggregate resource will have associated with it in its status database several parameter values which are prestored by a system operator based upon his or her understanding of the connectivity and real resource personality contained in the system.

A first parameter value indicates a threshold number or value for underlying real resource elements that must be found in an unsatisfactory state before the status of the aggregate resource is reflected as being degraded. The second parameter value indicates a number of underlying real resource elements that must be found in an unsatisfactory state before the system determines that the status of an aggregate resource should be changed from degraded to severely degraded and a third parameter value represents a threshold for changing the aggregate resources status from severely degraded to unsatisfactory.

The status determination calculation system and method perform aggregate status calculation determinations based upon the status of the real resources that are monitored which are found to be descendents of the aggregate rather than on the status of any child aggregates contained within the higher level aggregate itself. A fourth parameter is a stored threshold value associated with each real resource describing its aggregation priority and indicating to the determination system and method how much effect a change in status of a contained real resource should have upon a higher level parent or grandparent aggregate. This threshold value is a number from 0 to n where n is the number of layers in the network and indicates how far up the hierarchical tree of the network to turn the parent or grandparent of an aggregate of the real resource being monitored to a status of degraded. In assigning a new status for an aggregate resource, the calculation method and system look at the status of the real resources that are the descendents of the aggregate resource, determining an aggregate status for the aggregate resource based upon the threshold parameter values associated therewith and also upon the aggregation priority of any affected real resources which are descendents of the aggregate and currently residing in an unsatisfactory state.

BRIEF DESCRIPTION OF THE DRAWINGS

The foregoing objects are met in a preferred embodiment of the invention that well be described in greater detail with reference to the drawings in which:

FIGS. 2A–2C illustrate a typical flowchart for the process carried out by the system in the preferred embodiment for determining the status of an aggregate resource based upon the reported status conditions of underlying real resources, parametric values obtained from a database and comparison conditions.

DETAILED DESCRIPTION OF PREFERRED EMBODIMENT

Figure 1:
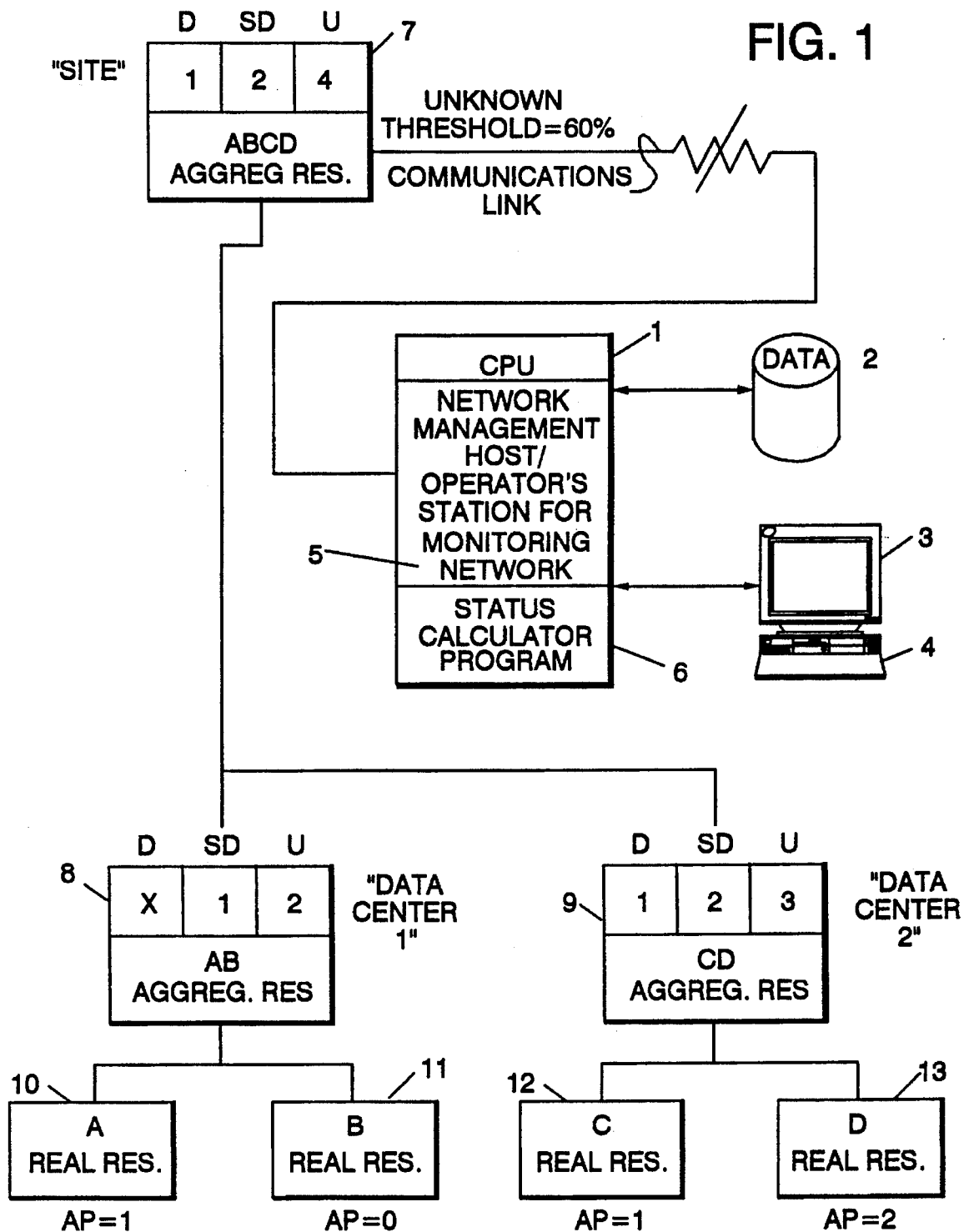
FIG. 1 illustrates a high level schematic topological arrangement of a network of resources including real resources and aggregate resources whose status is to be determined.

FIG. 1 schematically illustrates an interconnected network that may represent communication elements or other entities in a layered or hierarchical arrangement with respect to one another. The example shown in FIG. 1 may be taken as an illustration of a typical computer data processing network having the CPU, data storage, network management programs, a host operator station for monitoring the network with a display, a keyboard, etc. connected via a communications link to an aggregate resource generally termed a site or locus which may include a plurality of subservient computers which might be data centers each of which may contain one or more real resources such as work stations or subservient computers or other data generating devices.

The aggregate resources such as the data centers or the site may be known to the network management host operator only as an aggregate without real detail of the underlying, real resources that make up the highest level "site" aggregate. Of course, access to a repository of data containing the topological interconnection scheme and details of the physical and logical entities may be used to generate an overall view or picture of the aggregate resource as is commonly done with network management products such as the IBM Corporation's NetView program. However, merely knowing the configuration or identity of the elements making up the network and their interconnection scheme does not directly lead to an understanding of what the present operative status of an aggregate resource may be since only the real physical or software resources actually report conditions of their operation to their network management system at the host.

Each real resource may assume several possible status conditions such as: "satisfactory", indicating that most or all of its capability is in satisfactory working order, or "unsatisfactory", indicating that most or all or a preponderance of the real resources are in an unsatisfactory status. Other statuses or types of status might be envisioned, but for the purposes of this illustration these are sufficient.

The status of an aggregate resource is not as easily determined since it may contain multiple real resources both hardware and software which may have divergent status and in which a minor degradation of one real resource among several contained within an aggregate may not significantly affect the operability status of the aggregate as a whole.

In order to address the problem of providing an accurate assessment of the operability status of an aggregate resource, the present invention makes use of the network topology and status database to contain a plurality of threshold parameters used for assessing the condition of real resources contained within an aggregate resource and in forming computational and analytical assessments of the effect of their status upon the overall status of the aggregate resource.

Turning to FIG. 1, the overall configuration and topology of an interconnected network for communications or reporting or other hierarchical or management system of resources is shown. In FIG. 1, the host CPU 1 comprises a database 2, display 3, an operators input station 4 and a network management program 5 which gathers information on the operative status and condition present in the network from all of the known reporting real resource elements. A status calculator program 6 resides in host 1 for execution at the direction of the operator at work station 4. A communications link connects the CPU to the entities that are represented by an aggregate resource 7, termed a "site" or installation. The installation contains two additional aggregate resources termed "data center 1" and "data center 2" which are numbered 8 and 9, respectively. Each data center 1 and 2, as an aggregate resource, also contains real physical resources of hardware or software nature numbered 10–13 as shown.

Each aggregate resource has several parametric values for it stored in database 2 by the operator or the network management program 5 at initiation of operation or updated by human intervention. Parameters indicating the levels at which degraded, severely degraded or unsatisfactory performance of an aggregate resource are to be determined are stored as threshold values in the database 2. For convenience, these values are indicated as register or counter contents and are depicted in the aggregate resources 7, 8 and 9 as being present as values for those aggregate resources, although the values need not be physically stored at the location where the aggregate resources are defined and would normally be stored in the database 2.

An additional parametric value is contained in database 2 for the threshold of "unknown" condition set at an arbitrary value which will be described in greater detail later. Similarly, each real resource has stored for it in the database a threshold parameter for its "aggregation priority" of effect on higher level parent, grandparent, etc. as will be discussed in greater detail later.

A status calculator program 6 operates in the host CPU 1 under control of the network management code 5 and the host operator via the control station 4. These are used to determine the aggregate status for an aggregate resource utilizing program means operating in accordance with a method that will be described in greater detail.

FIG. 1 illustrates an arbitrary example, not necessarily of a communications environment, in which there are a number of elements in a network connectivity hierarchy in which the status of the aggregate resources 7, 8 and 9 is to be monitored by a monitoring CPU and management program. Four real resources A, B, C and D are illustrated as residing at the resource locations identified by the numerals 10, 11, 12 and 13, respectively. Their status will be the determinative factor in deciding the status of the aggregate resources. The aggregate resources contain or are superior to the real resources according to the example given in FIG. 1, so that the data center 1 which is identified with the numeral 8 is an aggregate resource owning or representing the real resources A and B, while aggregate resource 9 represents resources C and D that are real resources. The higher level aggregate resource 7 comprises the aggregate resources 8 and 9 so that it includes the real resources A, B, C and D within its environment.

Let us suppose that all four real resources 10–13 are initially in a satisfactory state and that resource A (numeral 10) goes into an unsatisfactory or failure state. The status calculator program and method 6 in the CPU 1, when called upon to determine the status of the aggregate resource 7 or 8, will first determine the number of real resources that are the descendants of the aggregate resource 8, the parent resource for resource A. If the aggregate resource 8 does not have any real resources as descendants, its status will be set to "unknown" and the calculation will be complete. In this example, real descendants of aggregate resource 8 do exist, so the status calculator 6 will determine the ratio of real descendants having a status of "unknown" to the total number of real descendants, since in this example neither real resource A or B has a status value of "unknown", the ratio will be 0. The ratio is compared in the status calculator 6 to a threshold ratio for determining a status of "unknown" for the aggregate resource AB. In the example illustrated in FIG. 1, this threshold value is taken as 60%. If the calculated ratio turns out to be greater than or equal to this threshold value, the status of the aggregate resource AB will be determined by the status calculator 6 to be "unknown" and the calculation will end. However, in this example, the ratio that is calculated is less than the threshold for attaining "unknown" status, so the calculation continues.

Next the status calculator will examine parameter values stored in association with the aggregate resource 8. The first value is the parameter value indicating the number of real resources that must be found in an unsatisfactory state in order to determine that the aggregate resource 8 should also be in a "degraded" state. In the example illustrated in FIG. 1, the value of this parameter is listed under the "D" heading as being contained in a register, counter or memory cell in association with the aggregate resource 8, although it would be understood that the actual parameter value would be stored in the database 2 for examination by the status calculator program 6. The first parameter value is set to X in this example, indicating that the aggregate resource 8 will not be put into a degraded state under any circumstances except by the aggregation priority, described on page 10. This is an arbitrary example and instead of X, a value of 1 or 2, etc. might have been entered.

The second parameter value is the content of the counter or register memory space identified by "SD" for "severely degraded". This is the threshold value at which the aggregate resource 8 should be placed in the severely degraded state. In this example, this parameter value is set to 1, indicating that the aggregate resource 8 will be placed in the severely degraded state if at least one underlying real resource A or B is found to be in an unsatisfactory or failed state.

The third parameter value is identified by "U" and stands for the threshold level at which the aggregate resource 8 will be put into the "unsatisfactory" state. The content of this parameter is 2, indicating that the aggregate resource 8 will be put in the unsatisfactory state when at least two underlying real resources have been detected to be in an unsatisfactory state.

In the example outlined, the information contained in the parameters is compared with the example that a single real resource, resource A, has entered the unsatisfactory state and the aggregate resource 8 will be tentatively assigned a status of "severely degraded" since 1 is equal to or greater than the threshold level 1 for the aggregate resource 8 entering into the severely degraded state.

There is, however, a sensitivity in networks of this type in which an underlying real resource failing or entering an unsatisfactory state may be so serious in its effect that the entire aggregate resource should also be placed in a degraded state. To handle this possibility based upon the nature of each real resource and its potential effects upon higher levels in the network, the status calculator 6 will look at still a fourth parameter value assigned significance as an aggregation priority threshold for each real resource independently. The aggregation priorities are arbitrarily assigned based on the nature of each real resource and are shown in FIG. 1 as AP=1 next to real resource 10, AP=0 next to real resource B, etc. For the assumed example, real resource 10 A has failed or reached an unsatisfactory state. Its aggregation priority is equal to 1 indicating that the aggregate status of an aggregate resource one level higher than the real resource should be assigned a degraded status. However, the status calculator program 6 has already tentatively assigned a status of "severely degraded" for the aggregate resource 8 based on reaching of the severely degraded threshold parameter value. The status calculator will therefore select the more serious state of degradation, "severely degraded", as the calculated status of the aggregate resource 8.

Next the status calculator 6 will be asked to calculate or determine the status of the aggregate resource 7 containing the aggregate resources 8 and 9 which in turn contain the real resources A, B, C and D. The aggregate resource 7 has four real "grandchildren" as descendants, all of which have a known status so the calculation of the ratio of the number of real descendants having "unknown" status to the total number of real descendants will yield 0. Therefore the status calculator 6 will look at the values of the threshold parameters contained in the database 2 for each of the real resources contained by the aggregate resource 7 by way of aggregate resources 8 and 9. The status calculator will tentatively assign the aggregate resource 7 a status of "degraded" since the value of the parameter D for aggregate resource 7 is a 1 and one underlying real resource, resource A, has been found to have an unsatisfactory status. The aggregation priority of resource A is 1, also indicating that only the direct parent, i.e., the aggregate resource 8 for the real resource 10 will be affected by a change in status of the real resource. Therefore, the indicated status of the aggregate resource 7 will be set to "degraded" based upon the threshold value comparison with the calculated or reported status conditions of the underlying real resources.

Figure 2B:
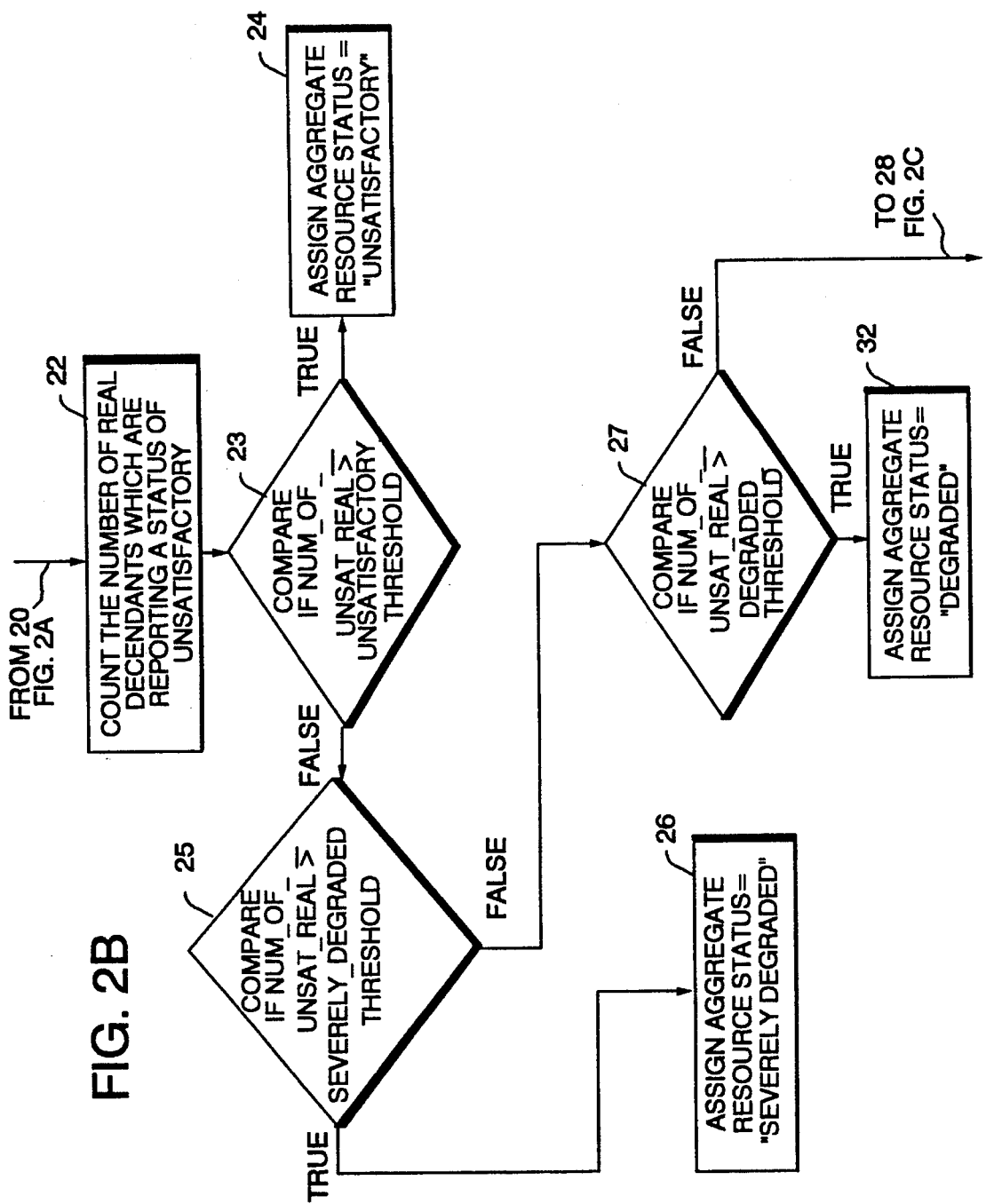

A flowchart of the process steps carried out by the status calculator program 6 in CPU 1 is given in FIG. 2. The first step is to access the stored records in the database as shown in the beginning block 14 of the flowchart in FIG. 2. In block 14, the calculator program 6 retrieves the aggregate resource topology configuration and status records to determine the current aggregate status shown for an aggregate resource and to retrieve the threshold parameters and aggregation priority parameter values as shown in block 15. Next the program examines the retrieved record and determines the number of real descendants which a given aggregate resource represents as shown in block 16. In block 17, the program 6 compares the number of real descendants found for the aggregate resource in question to 0. If there are no real descendants, block 18 is entered and the aggregate resource status is set to "unknown". However, if real resources do exist, block 19 is entered and the program calculates ratio of the number of real resources having a status of unknown to the total number of real resources which are descendants of the aggregate resource being studied.

In block 20 the calculated ratio or percentage is compared against a threshold value retrieved in blocks 14 and 15. If the number of real descendants reporting an unknown status exceeds an arbitrary threshold value (60% as shown in FIG. 1) the comparison in block 20 will direct the flow to block 21 so that the aggregate resource being studied will be assigned a status of "unknown". However, if the ratio is less than the threshold ratio parameter value in block 20, block 22 will be entered and program 6 will determine the number of real descendants for the aggregate resource that are currently reporting a status of unsatisfactory.

In block 23 the number of real descendants of the aggregate resource that report a status of unsatisfactory are compared to a second parameter value representing the threshold at which the aggregate resource is to be set into the unsatisfactory status. If the comparison indicates the number of real resources is greater than or equal to this parameter value, block 24 is entered and the aggregate resource is assigned a status of unsatisfactory. However, if the comparison in block 23 is false, block 25 is entered where a further comparison is made between a third parameter value, indicating the level at which a severely degraded threshold exists for the aggregate resource, and the number of real descendant resources of the aggregate resource being studied that have been detected as being in an unsatisfactory condition. If the comparison shows the number of real resources having an unsatisfactory condition is greater than or equal to this third threshold parameter value, block 26 is entered and the aggregate resource is assigned a status of severely degraded. However, if the comparison in block 25 is false, block 27 is entered.

In block 27 a fourth comparison is made against another threshold parameter value obtained in blocks 14 and 15. The number of real resource descendants to the aggregate resource being studied which are reporting an unsatisfactory condition are compared with this fourth threshold parameter value. If the number of real, unsatisfactory status resources is greater than or equal to this fourth threshold, block 32 is entered and the aggregate resource is assigned a status of degraded. However, if the comparison in block 27 is false, block 28 is entered. The number of real descendants of the aggregate resource under study which have an unsatisfactory status and an aggregate priority parameter value which is equal to the level in the hierarchical network occupied by the particular aggregate resource under study is determined. Then block 29 is entered where the number of real resources having an unsatisfactory condition and an aggregation priority of greater than or equal to the level of the particular aggregate resource is found. If any of the real resources in an unsatisfactory condition have an aggregation priority that is greater than or equal to the level of the particular aggregate resource, block 30 is entered and the aggregate resource status is set to degraded, but if none of these real resources has an aggregation priority that is greater than or equal to the level in the heirarchical network occupied by the particular aggregate under study, block 31 is entered and the aggregate resource status is calculated to be satisfactory.

In the examples of the preferred embodiment just described, it should be apparent that the initial parameter values and priority values that may be set into the database 2 for each resource are arbitrary and based upon the initial assumed default values. The user or system operator can easily update or change the priority or parameter values. Typically, tables of parameter values that correspond with the various types of resources are made available with a network management resource program such as 5 shown in FIG. 1. The manufacturer assigns parameter values based upon the significance of a failure or status change of a given element of a certain type in a network or hierarchical arrangement. As new types of resources are made available to the users, new tables of values can easily be shipped for updating or augmenting the database, but no changes to the process and program 6 will be required since it will generically act on the values obtained from the data tables for the individual resource types. It will go through the same calculation and comparison steps without changing the logic of the status calculation for aggregate resources.

Therefore, what is desired to be protected by letters patent is set forth in the following claims by way of example only and not of limitation in which what is claimed is:

1. A computer implemented method for determining the operational status of an aggregate resource residing in a network of interconnected real resources, said aggregate resource being defined as a logical resource including a plurality of real resources and represented by a configuration record stored in a database wherein said configuration record contains a list of said real resources and a current operational status and an aggregation priority value for each said real resource and further contains a plurality of predefined parameter values that are used to determine the operational status of said aggregate resource, said method being executed by a monitoring computer and comprising the steps of:

determining from said configuration record the number of real resources contained within said aggregate resource and having an operational status of a first type;

comparing said number of real resources having the operational status of said first type with said plurality of predefined parameter values and assigning said aggregate resource an operational status corresponding to the largest of said predefined parameter values that is equalled or exceeded by said number of real resources having the operational status of said first type; and if said number of real resources having the operational status of said first type is less than the smallest of said predefined parameter values, determining if any of said real resources having the operational status of said first type also has a non-zero aggregation priority value, such that:

for each said real resource having the operational status of said first type and said non-zero aggregation priority value, determining if the operational status of said real resource should be assigned as said operational status of said aggregate resource;

if the operational status of any of each said real resource should be assigned as the operational status of said aggregate resource, assigning said operational status of said real resource to said operational status of said aggregate resource; and if the status of each said real resource should not be reflected in said operational status of said aggregate resource, assigning said aggregate resource an operational status of satisfactory.

2. The method as claimed in claim 1 further comprising the steps of:

determining from said configuration record the number of said real resources contained within said aggregate resource and the number of said real resources having the operational status of a second type;

calculating a ratio of the number of said real resources having the operational status of said second type to the number of real resources contained within said aggregate resource;

retrieving a threshold value from said configuration record and comparing said threshold value to said calculated ratio; and if said calculated ratio exceeds said threshold value, assigning the operational status of said second type to said aggregate resource.

3. The method as claimed in claim 1 wherein said aggregate resource includes a plurality of other aggregate resources with each of said other aggregate resources including a plurality of real resources, said step of determining if the operational status of said real resource should be assigned as said operational status of said aggregate resource includes:

arranging said plurality of other aggregate resources and said plurality of real resources in a hierarchical structure and assigning a sequential level number to each level in said hierarchical structure, said aggregate resource being assigned the highest sequential level number;

propagating said operational status of said real resource upwards a number of levels in said hierarchical structure corresponding to said aggregation priority value of said real resource.

4. The method as claimed in either of claim 1 or 2 further comprising the step of recording said operational status of said aggregate resource in said configuration record.

5. A computer system for determining the operational status of an aggregate resource residing in a network of interconnected real resources, said aggregate resource being defined as a logical resource including a plurality of real resources and represented by a configuration record stored in a database wherein said configuration record contains a list of said real resources and a current operational status and an aggregation priority value for each said real resource and further contains a plurality of predefined parameter values that are used to determine the operational status of said aggregate resurce, said system comprising:

means for determining from said configuration record the number of real resources contained within said aggregate resource and having an operational status of a first type;

means for comparing said number of real resources having the operational status of said first type with said plurality of predefined parameter values and assigning said aggregate resource an operational status corrsponding to the largest of said predefined parameter values that is equalled or exceeded by said number of real resources having the operational status of said first type; and, if said number of real resources having the operational status of said first type is less than the smallest of said predefined parameter values:

means for determining if any of said real resources having the operational status of said first type also have a non-zero aggregation priority value;

for each said real resource having the operational status of said first type and said non-zero aggregation priority value, means for determining if the operational status of said real resource should be assigned as said operational status of said aggregate resource;

means for assigning said operational status of said real resource to said operational status of said aggregate resource if the operational status of any of each said real resource should be assigned as the operational status of said aggregate resource; and, means for assigning said aggregate resource an operational status of satisfactory if the status of each said real resource should not be reflected in said operational status of said aggregate resource.

6. The system as claimed in claim 5 further comprising:

means for determining from said configuration record the number of said real resources contained within said aggregate resource and the number of said real resources having the operational status of a second type;

means for calculating a ratio of the number of said real resources having the operational status of said second type to the number of real resources contained within said aggregate resource;

means for retrieving a threshold value from said configuration record and comparing said threshold value to said calculated ratio; and, means for assigning the operational status of said second type to said aggregate resource if said calculated ratio exceeds said threshold value.

7. The system as claimed in claim 5 wherein said aggregate resource includes a plurality of other aggregate resources with each of said other aggregate resources including a plurality of real resources, said means for determining if the operational status of said real resource should be assigned as said operational status of said aggregate resource including:

means for arranging said plurality of other aggregate resources and said plurality of real resources in a hierarchical structure and assigning a sequential level number to each level in said hierarchical structure, said aggregate resource being assigned the highest sequential level number; and, means for propagating said operational status of said real resource upwards a number of levels in said hierarchical structure corresponding to said aggregation priority value of said real resource.

8. The system as claimed in either of claims 5 or 6 further comprising means for recording said operational status of said aggregate resource in said configuration record.

* * * * *